B. I. WILLIAMS.
Churn.
No. 207,581.  Patented Aug. 27, 1878.
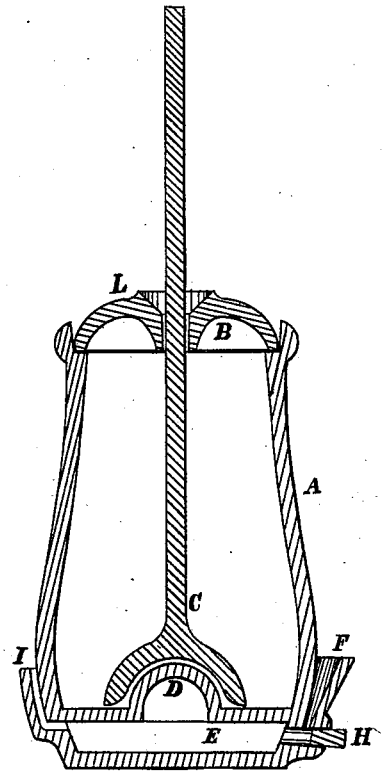
Witness
O. N. Fuller
John Eichele
Inventor
Benjamin I. Williams

UNITED STATES PATENT OFFICE.

BENJAMIN I. WILLIAMS, OF LANSING, MICHIGAN.

IMPROVEMENT IN CHURNS.

Specification forming part of Letters Patent No. 207,581, dated August 27, 1878; application filed January 28, 1878.

*To all whom it may concern:*

Be it known that I, B. I. WILLIAMS, of the city of Lansing, in the county of Ingham and State of Michigan, have invented a new and useful Improvement in Churns, which improvement is fully set forth in the following specification and accompanying drawing, which is a sectional view of my improved churn.

My invention relates more particularly to the common vertical-dasher churn.

The object of my invention is to furnish a churn that shall be simple and inexpensive in construction and convenient in use, which shall be so constructed as to bring the best butter in a very short time, and which will enable the milk to be warmed or cooled, as may be desired, readily, and without pouring water into the milk.

The nature of the invention consists in the construction of a churn made in one piece of stoneware, that will be hereinafter more fully explained in connection with the drawing, in which—

A is a round stone churn, which has a double bottom, with a space between, which forms a reservoir, as at E, which may be filled with water by pouring it into the funnel-shaped tube which is upon the outside and near the bottom of the churn at F. Said funnel leads down through an orifice at H, which is open straight through from the reservoir to the outside, and the outer end is stopped with a cork. This orifice is for the purpose of drawing the water from the reservoir when desired. Upon the opposite side of the churn, at I, is a vent for the air while pouring in water at F.

The dasher C is in the form of a half-ball with the flat side down, made hollow for the purpose of carrying air down through the milk, which is then forced out through the milk by the dome D. L is the cover, which has a deep annular channel formed in the bottom side, as shown at B, which throws the milk that flies upward, by the action of the dasher, from the small opening around the dash-staff in the center, also from the joint which is around the edge of the cover, and prevents it from spattering out.

It will be observed that the churn A, with its double bottom, funnel F, orifice H, vent I, and dome D, are all made together as one piece of stoneware, the cover being one piece, also of stoneware, and that the dasher is the only piece of wood about the churn. Therefore, there are no cracks or joints for the milk to work in and become sour, and it is a well-known fact that stoneware is the best material for a churn, and that in such churns the best butter is made.

I am aware that stone churns have been made before, but only with a single bottom, and without any other improvement. Therefore, I do not claim the stone churn alone; neither do I claim the reservoir for water in or under the bottom of a churn, nor the manner of filling the reservoir.

Having thus described my invention, what I claim as new, and desire to secure by Letters Patent, is—

The within-described improved churn, made in one piece of stoneware, and consisting of the body A, having the dome D in the bottom of the churning-chamber, and the reservoir E located beneath said chamber, and provided with funnel F, outlet H, and vent I, as set forth.

BENJAMIN I. WILLIAMS.

Witnesses:
  O. V. FULLER,
  CHAS. E. DAYTON.